US012614455B2

(12) United States Patent　(10) Patent No.: US 12,614,455 B2
Freischem　(45) Date of Patent: Apr. 28, 2026

(54) METHOD FOR COORDINATING ROAD USERS VIA A SERVER DEVICE, AND SERVER DEVICE AND A CONTROL CIRCUIT FOR CARRYING OUT THE METHOD

(71) Applicant: AUDI AG, Ingolstadt (DE)

(72) Inventor: Karsten Freischem, Kipfenberg (DE)

(73) Assignee: AUDI AG, Ingolstadt (DE)

( * ) Notice: Subject to any disclaimer, the term of this patent is extended or adjusted under 35 U.S.C. 154(b) by 411 days.

(21) Appl. No.: 17/926,460

(22) PCT Filed: Mar. 23, 2021

(86) PCT No.: PCT/EP2021/057360

§ 371 (c)(1),
(2) Date: Nov. 18, 2022

(87) PCT Pub. No.: WO2021/249677

PCT Pub. Date: Dec. 16, 2021

(65) Prior Publication Data

US 2023/0186767 A1　Jun. 15, 2023

(30) Foreign Application Priority Data

Jun. 9, 2020　(DE) ..................... 10 2020 115 233.7

(51) Int. Cl.
*G08G 1/0968*　(2006.01)
*B60W 50/06*　(2006.01)
(Continued)

(52) U.S. Cl.
CPC ....... *G08G 1/096811* (2013.01); *B60W 50/06* (2013.01); *G08G 1/012* (2013.01);
(Continued)

(58) Field of Classification Search
CPC ............. G08G 1/096811; G08G 1/012; G08G 1/0133; G08G 1/052; G08G 1/096775;
(Continued)

(56) References Cited

U.S. PATENT DOCUMENTS 11,435,757 B2 * 9/2022 Hasberg ................. H04W 4/02
2016/0027300 A1 * 1/2016 Raamot ............... G08G 1/0145
340/922

(Continued)

FOREIGN PATENT DOCUMENTS

DE　10 2009 008 745 A1　2/2009
DE　10 2013 223 217 A1　5/2015
(Continued)

OTHER PUBLICATIONS

Microsoft Computer Dictionary, "Latency," 2002 (Year: 2002).*

(Continued)

*Primary Examiner* — Stephanie T Su
(74) *Attorney, Agent, or Firm* — STAAS & HALSEY LLP

(57) ABSTRACT

A method of coordinating road users via a server device which determines instruction data by a central model and transmits the instruction data as action instruction to respective control circuits of the road user, the central model being a virtual image of a real environment created by the server device from environment data, includes when a road user reaches the real environment a local model is created by onboard sensor data and delta data relating to the central model is determined. The delta data is transmitted to the server device by the control circuit of the road user which creates an updated central model by the delta data and the central model. The server device determines and transmits updated instruction data to the road user as readjustment of the instruction data.

16 Claims, 2 Drawing Sheets

(51) Int. Cl.

| | |
|---|---|
| *B60W 60/00* | (2020.01) |
| *G08G 1/01* | (2006.01) |
| *G08G 1/052* | (2006.01) |
| *G08G 1/0967* | (2006.01) |

(52) U.S. Cl.
CPC .......... *G08G 1/0133* (2013.01); *G08G 1/052* (2013.01); *G08G 1/096775* (2013.01); *B60W 60/001* (2020.02); *B60W 2556/00* (2020.02)

(58) Field of Classification Search
CPC .............. G08G 1/0145; G08G 1/0112; G08G 1/096725; G08G 1/164; B60W 50/06; B60W 60/001; B60W 2556/00; G06V 20/56

See application file for complete search history.

(56) References Cited

U.S. PATENT DOCUMENTS

| 2017/0345300 | A1* | 11/2017 | Kawai | ................... | G01S 13/931 |
|---|---|---|---|---|---|
| 2020/0094821 | A1* | 3/2020 | Kim | ................. | B60W 30/0956 |
| 2021/0056712 | A1* | 2/2021 | Daudelin | ............... | G06V 20/58 |
| 2021/0291862 | A1* | 9/2021 | Jiang | ................. | B60W 60/0017 |
| 2021/0300412 | A1* | 9/2021 | Dingli | .............. | B60W 50/0098 |

FOREIGN PATENT DOCUMENTS

| DE | 10 2014 220 687 A1 | 4/2016 | | |
|---|---|---|---|---|
| DE | 10 2017 202 065 A1 | 8/2018 | | |
| DE | 10 2017 203 662 A1 | 9/2018 | | |
| DE | 10 2017 217 443 A1 | 4/2019 | | |
| DE | 10 2018 207 968 A1 | 11/2019 | | |
| DE | 10 2020 115 233.7 | 6/2020 | | |
| DE | 10 2019 201 484 A1 | 8/2020 | | |
| WO | WO-2019166143 A1 | * 9/2019 | ........ | B60W 60/0027 |
| WO | PCT/EP2021/057360 | 12/2021 | | |

OTHER PUBLICATIONS

Driver Knowledge Tests, 2015. (Year: 2015).*

International Search Report (Form PCT/ISA/210); mailed Jun. 29, 2021 in corresponding PCT Application No. PCT/EP2021/057360; (3 pages) (2 pages English Translation).

International Preliminary Report on Patentability (Form PCT/IPEA/409; Form PCT/IPEA/416); dated Nov. 22, 2021 in corresponding PCT Application No. PCT/EP2021/057360 (15 pages) (5 pages English Translation).

Notification of Transmittal of Copies of Translation of International Preliminary Report on Patentability (Form PCT/IB/338); mailed Dec. 15, 2022 in corresponding PCT Application No. PCT/EP2021/057360 (1 page).

Examination Report dated Jan. 22, 2021 in corresponding German Application No. 10 2020 115 233.7 (2 pages).

First Office Action mailed Feb. 8, 2023 in related Chinese Patent Application No. 202180008055.5 (11 pages).

* cited by examiner

METHOD FOR COORDINATING ROAD USERS VIA A SERVER DEVICE, AND SERVER DEVICE AND A CONTROL CIRCUIT FOR CARRYING OUT THE METHOD

CROSS REFERENCE TO RELATED APPLICATIONS

This application is a U.S. national stage of International Application No. PCT/EP2021/057360, filed on Mar. 23, 2021. The International Application claims the priority benefit of German Application No. 10 2020 115 233.7 filed on Jun. 9, 2020. Both the International Application and the German Application are incorporated by reference herein in their entirety.

FIELD

Described examples of the invention relate to a method for coordinating road users via a server device, and a server device and a control circuit for carrying out the method.

BACKGROUND

For automated driving of a motor vehicle at Level 3 or 4 or autonomous driving at Level 5 (Level indications in accordance with the standard SAE J3016), detailed environment and vehicle state data are essential. These environment data comprise e.g. road information, geographic information, indications concerning buildings/constructions, traffic management systems (in particular traffic signs, traffic light systems), weather data, traffic information concerning traffic density and traffic flow, geopositions of further road users, such as e.g. pedestrians and cyclists. These environment data are captured for the most part using a wide variety of technologies appertaining to vehicle sensor systems and are optionally augmented by information from data providers. In present-day approaches for environment capture and evaluation, the aim is to carry out the calculations almost in real time in the vehicle.

However, this calculation requires high computation capacities in the vehicle, correspondingly high power demands (e.g. for processors, air conditioning) and large amounts of data which have to be transmitted into the vehicle or received from the vehicle. A real-time capability is therefore technologically complex. The overhaul (e.g. calibration) or maintainability of the individual vehicle is achievable only with high complexity and is thus associated with high costs. Even only partial enabling of the present-day vehicle population by retrofitting, for example, is therefore not possible in practice.

DE 10 2009 008 745 A1 discloses a method and a system for automatic traffic guidance. The system comprises a central control unit, which serves for calculating an environment model from environment data of a plurality of vehicles, wherein traffic guidance data are determined from the environment model and transferred to the vehicles.

DE 10 2013 223 217 A1 discloses a method for operating a server. The server is used for forming aggregated environment data from individual environment data of a plurality of vehicles, wherein a deviation of the aggregated environment data from the individual environment data is determined.

DE 10 2014 220 687 A1 discloses a communication device for a vehicle and a method for communicating. The vehicle comprises a sensor device used for capturing sensor data, wherein the vehicle receives reference data of an external management device and determines a deviation of the reference data from the sensor data and the deviation is transferred to the central management device.

What is disadvantageous about the prior art cited is that sensor-related deviations of a traffic situation are not detected.

SUMMARY

According to described examples, a method of coordinating road users which involves readjusting measures on account of sensor-related deviations of the road user.

The described examples may be recited by the independent patent claims. Advantageous developments of the examples may be described by the dependent patent claims, the following description and the figures.

According to the examples, a method of coordinating road users via a server device, wherein the server device, from environment data of an environment, repeatedly creates a digital central model of the environment and calculates respective instruction data for an action instruction for at least one of the road users by the central model, wherein the respective action instruction predefines an action to be executed by the respective road user in the environment, and transmits the respective action instruction to the respective road user.

The method is characterized in that repeatedly the server device provides at least some of the road users with the central model for a comparison with the environment and receives from at least one or some of the road users delta data, describing a difference between the environment and the central model, said difference being detected by the road users, and updates the central model on the basis of the delta data and uses the updated central model to check whether the instruction data are in need of correction in accordance with the predetermined correction criterion, and in the case where instruction data in need of correction are identified, the latter are updated by adapting the instruction data for the action instruction to the updated central model and the updated instruction data are transmitted to the respective road user for which the respective action instruction is intended.

In other words, the calculation of instruction data describing, for example, the carrying out of a steering or braking maneuver can be relocated from the actual road user to a server device. The road user can be for example a motor vehicle having a control circuit, a pedestrian or a cyclist each having a user device having the control circuit. The road users are thus coordinated by the server device. For this purpose, the server device can provide a central model of the environment of the road user, which is generated using data from a plurality of sources. By way of example, these may be data of a road map, data from road users, data from buildings, road information, geographic information, data of a traffic management system (e.g. traffic signs, traffic light systems), weather data or traffic density and traffic flow. In this case, the data from road users can comprise sensor data of a vehicle ahead and/or position data of a pedestrian or cyclist, which are provided for example by a mobile terminal. The central model is maintained from the data enumerated.

The aforementioned road user provided with the central model by the server device can be a motor vehicle having a control circuit, such that the motor vehicle can be equipped for autonomous driving operation by the control circuit. For the aforementioned motor vehicle, the instruction data for at least one action instruction, on the route of the motor vehicle, can be calculated by the server device by the central model and be transmitted to the motor vehicle. This can be done repeatedly while the motor vehicle is traveling, for example at predetermined time intervals. The motor vehicle can thus travel along the route in the real environment virtually in the central model in the server device in parallel and/or in advance, wherein the calculation of the instruction data can be carried out by the server device by of the central model. The generally complex calculation of the instruction data for the motor vehicle can thus be relocated to the server device, which can transmit the resulting instruction data to the motor vehicle.

In this case, the action instruction can comprise at least one of the following elements: a driving command for a motor vehicle, a text output and/or voice output and/or a haptic output. The last-mentioned examples of an action instruction are advantageous in particular if the utilizing road user is a pedestrian or a cyclist. By way of example, a visually impaired pedestrian can be provided with an acoustic and/or a haptic warning indication via a mobile terminal for warning about a cyclist crossing. In this case, the mobile terminal then constitutes a control circuit within the described examples.

In general, the environment in reality, in particular in town/city traffic, changes frequently in comparison with the central model. The change in the environment can be determined in the motor vehicle by a comparison of vehicle-side sensor data, such as, for example, vehicle data (speed, steering lock), data of a camera system, data of a radar sensor and/or data of a rain sensor, with the central model when the motor vehicle reaches the respective real environment. The comparison of the vehicle-side sensor data with the central model can be carried out for example by a control circuit installed in the motor vehicle. After data of the central model have been received by the control circuit in the motor vehicle upon reaching the respective environment, a vehicle-side model of the environment can be created by the control circuit on the basis of the vehicle-side sensor data. This vehicle-side model generated locally in the motor vehicle is also referred to here as a local model. The local model can be compared with the central model of the server device. By way of example, the difference between the vehicle-side local model and the central model of the server device may reside in the occurrence of a cyclist who was detected by a vehicle-side camera system, but not taken into account by the server device. From the difference between the vehicle-side local model and the central model, delta data of the environment can be calculated by the control circuit, which delta data can comprise for example position, speed and/or direction of the cyclist or generally of a newly detected object. The delta data can subsequently be transmitted from the control circuit to the server device.

The server device can update the central model by the delta data containing the respective environment. The server device can then use the updated central model also to check whether a correction of the instruction data in accordance with a correction criterion is necessary. In the example of the cyclist not taken into account by the server device, the server device can ascertain by the updated central model that the motor vehicle is at less than a minimum distance from the cyclist. The predetermined correction criterion may be for example a minimum distance of 1.5 from the cyclist when driving past. If the server device ascertains by the updated central model that the minimum distance is undershot on the basis of the previous instruction data, the server device can update the instruction data on the basis of the updated central model, which instruction data can provide for example a steering lock in order to comply with the minimum distance. The updated instruction data can be transmitted to the corresponding motor vehicle in order to carry out an evasive maneuver in order to comply with the minimum distance.

In the case where the road user is a pedestrian or a cyclist, the road user can receive action instructions as an acoustic or haptic output via a mobile terminal as user device, which tracks the current geoposition of the pedestrian in the real environment in the central model of the server device. By way of example, for the purpose of assistance in road traffic, via a mobile terminal, for example a smartphone with a corresponding application as control circuit, a visually impaired pedestrian can be warned about a cyclist crossing by an acoustic output, such as, for example, "Attention, cyclist from the left!". The acoustic output can likewise be combined or replaced by a haptic output, for example vibration.

The examples may afford the advantage that the calculation of the action instructions for autonomous motor vehicles is relocated to a server device which carries out the calculation in real time from a macroperspective or a helicopter perspective of the situation of the real environment instead of the sole perspective of the respective road user. This affords the advantage that relocating the real-time calculation of the action instructions to a server device enables the energy requirement of the respective road user to be reduced. This can reduce the complexity of the hardware and software installed in the vehicle, which can result in reduced energy consumption from computing power of the respective motor vehicle. In addition, motor vehicles can be retrofitted with a corresponding control circuit for autonomous driving operation. Further road users such as, for example, visually impaired pedestrians can likewise be assisted. This can be realized for example by a user device having the control circuit, for example a smartphone with a corresponding application, which can output acoustic and/or haptic warning indications comprehensible to a person.

The described examples afford additional advantages.

In an example, the adaptation of the action instruction may be prioritized by the server device depending on a speed of movement of the respective road user and/or a traffic situation that the respective road user is in, that is to say that a decision is taken as to whose action instruction is adapted first and/or more frequently. In other words, in order to take account of the change frequency of the respective real environment, the action instruction of the respective road user can be readjusted correspondingly frequently. As a result of the prioritization, for the case where an adaptation is necessary for a plurality of road users, the fastest moving road user can be dealt with first. In particular a traffic situation such as can occur in a town/city in commuter traffic or at a high speed of the road user (greater than e.g. 80 km/h) on an interstate highway can entail a change in the current traffic situation, such as, for example, a lane change by another vehicle, which makes the speed-dependent prioritization advantageous. In order to take account of the frequent change in the traffic situation, the frequency of the readjustment of the action instruction for the respective road user can be correspondingly adapted according to the traffic situation that the respective road user is currently in and/or according to the speed of the respective road user. In this case, the readjustment can be prioritized on the basis of the traffic situation and/or the speed of the road user. In this regard, it is to be expected that in commuter traffic in a town/city the traffic situation will change more frequently than on a little used interstate highway. This affords the advantage that it is possible to react even to sudden events in the traffic situation in a timely manner and the amount of data transferred between road user and server device can be optimized.

The prioritization of the change frequency of object data of a traffic object in the central model can also be adapted according to a category of the traffic object since in general pedestrians, cyclists and motor vehicles move at different speeds. In this case, object data are taken to mean data describing a traffic object in the central model, such as, for example, object category, position, speed or direction of the respective traffic object. In this regard, one embodiment provides that by the central model, one or a plurality of traffic objects are described and each traffic object is assigned to one from a plurality of predetermined object categories and the following is stipulated for each object category: a change frequency specifying the maximum rate at which delta data are intended maximally to be generated for each traffic object of this object category, and/or a priority stipulating an order with regard to determining the difference in order to focus an available computation time.

In other words, in the central model the traffic objects can be categorized in object categories, wherein the update frequency is determined for the respective object category. In this regard, in the central model traffic objects can be categorized for example in the object categories of pedestrian, motor vehicle or cyclist since the elements of a respective object category can move at a different speed. In this regard, for example, the object category of cyclist can have a greater change frequency than a pedestrian since the cyclist can cover a greater distance in the same time interval. If the central model is updated by delta data concerning a number of traffic objects in a real environment in a predefined time interval, the update of the position of the respective traffic object can be performed by the server device by the respective object category. In this regard, for example, firstly the position of a cyclist can be updated as that of a pedestrian.

The prioritization of the update of the object data of different traffic objects in the central model can likewise vary depending on the traffic situation. In this regard, by way of example, in an environment with town/city traffic, a cyclist can have a higher prioritization than a motor vehicle by comparison with interurban traffic. In this case, a high prioritization in the update of the object data in the central model corresponds to an accurate monitoring of the behavior of the respective traffic object. A categorization of the traffic objects that deviates from the example is likewise possible.

This affords the advantage that the necessary observation frequency of the respective traffic objects is taken into account and/or computation time can be saved. Consequently, the reaction time of the road user can be shortened and the road user can react to sudden changes in the traffic situation of the real environment, such as, for example, sudden veering of a cyclist.

In an example, the server device generates and/or updates the central model additionally on the basis of sensor data from at least one of the road users. In other words, the central model can be supplied with the sensor data provided by the respective road users. In this regard, this can be a motor vehicle which has a control circuit and which comprises a camera system and identifies a cyclist at the edge of the road by the camera system. In this case, the camera system of the motor vehicle can likewise estimate a speed and direction of the observed cyclist. The delta data formed as the difference between the environment observed by the motor vehicle and the central model of the environment can update the central model in the server device and/or an amount of delta data of a number of road users can generate the central model. This affords the advantage that the central model can virtually represent the real environment and on this basis from a macroperspective regarding a traffic situation of a real environment, it is possible to calculate an action instruction for the respective road users in the environment.

A multiplicity of further data can likewise be used for generating the central model. In this regard, in an example, the sensor data comprise at least some of the following: geoposition data of a current location of the road users, speed data of a speed of movement of the road users, observation data concerning the environment from the viewpoint of the road users.

In other words, the road users can each transmit a number of different data to the server device for updating and/or generating the central model. By way of example, a pedestrian can use a user device having the control circuit to transmit his/her current geoposition to the server device, which is then used in a central model for calculating an action instruction for another road user. If the road user is a motor vehicle, the control circuit of the motor vehicle can take account of vehicle-related data from a sensor circuit of the motor vehicle, such as, for example, speed, steering angle, route, observed objects from radar sensors and/or camera sensors, for transmission to the server device. Likewise, by a sensor fusion application, the control circuit can transmit results from a processing of the sensor data of the motor vehicle to the server device. Data from buildings, such as, for example, pedestrians detected by a surveillance camera, can likewise be transmitted to the server device for updating and/or generating the central model.

This affords the advantage that the central model is fed data from a multiplicity of different sources and a macroperspective of a traffic situation of a real environment can thus be generated for the calculation of an action instruction.

Furthermore, it is advantageous if a future position of traffic objects can be estimated. In this regard, in an example, a geoposition and/or a relative position of a traffic object moving in the environment are/is extrapolated in the central model by the server device. In other words, from at least one geoposition and/or one relative position of a traffic object with respect to a known road user and/or a traffic object, the server device can estimate a future position of the traffic object. By way of example, a speed and direction of the traffic object can be determined from a number of geopositions or alternatively a direction can be determined on the basis of an identification and categorization of the traffic object. In this regard, a speed can be estimated for example by an average speed of the object category of the respective traffic object. By way of example, for pedestrians it can be assumed that they move at a speed of 6 km/h. From the position, direction and speed, the server device can estimate a future position of the respective object and/or road user, such that for example a motor vehicle as road user which receives an action instruction from the server device and would like to turn off toward the right at an intersection can already take account of an approaching cyclist before the turning off process by virtue of a braking process being added to the associated action instruction for turning off to the right.

This affords the advantage that between the updates, too, the central model virtually represents the real environment in real time and can thus always remain close to the actual events in the real environment.

Since the server device may always virtually represent the real environment and extrapolates movement of the road users and traffic objects, the central model of the server device can function as a kind of subconscious for the respective road user, such that action instructions can be calculated rapidly. In this regard, in an example, the server device transmits temporally in advance the instruction data for action instructions with a future execution time, thus resulting in a latency value between a transmission time of the instruction data and the execution time, wherein, the latency value is set depending on a speed of the road user and/or a traffic situation in a region in front of the road user. In other words, for a road user to react to a traffic situation in a real environment, the action instruction for the respective road user can already be transmitted to the road user before reaching the real environment. In this case, the latency value corresponds to the time shift between transmission of the action instruction as transmission time and the time at which the road user reaches the respective real environment as execution time of the action instruction. In this case, the aforementioned latency value can vary for example depending on the traffic situation and/or a speed of the road user. In this regard, it may be advantageous, for example, if a motor vehicle as road user that is moving on an interstate highway receives in advance three minutes before estimated arrival at an end of a backup, for example, the action instruction to reduce speed in such a way that the motor vehicle stops in good time at an end of backup.

This affords the advantage that it is possible to react early to traffic situations and thus to enable anticipatory movement in road traffic for the respective road user.

In an example, the road user carries out the respective action instruction in a manner shifted temporally ahead by a latency value in a simulation and estimates a future traffic situation resulting therefrom by the central model. In other words, the respective road user, by the simulation of this road user's action instruction at the execution time and the central model, can estimate a future traffic situation as a consequence of this road user's action instruction. If a motor vehicle as road user is intended to overtake, as action instruction, for example a cyclist that the motor vehicle will reach in an estimated thirty seconds, as early as at the transmission time of said action instruction the control circuit can simulate whether the envisaged steering maneuver of the action instruction for overtaking the cyclist will result in moving into oncoming traffic for example. If the estimation of the future traffic situation on the basis of the simulation and the central model by the control circuit of the road user reveals a dangerous situation, this can be transmitted as part of the delta data to the server device in order, if appropriate, to correct the action instruction. This affords the advantage of producing double monitoring of the estimation of consequences of the respective action instructions to the road user, with the server device and the road user each providing one instance of said monitoring.

In an example, the respective road user carries out the following steps for the purpose of comparing the environment with the central model: by sensor data of a sensor circuit carried by the road user, the already digital local model of the environment is created and a difference between the local model and the central model is determined and described as model difference by the delta data, wherein the road user transmits the delta data to the server device. In other words, the road user can receive from the server device data concerning the central model and instruction data for an action instruction in the real environment and can transmit delta data as the difference between the local model and the central model to the server device. The server device can transmit data concerning the central model of a real environment with the respective action instruction to the road user. Upon reaching the environment, by the sensor data of the onboard sensor circuit, the road user can create a local model of the environment in an analogous to the central model. From the difference between the local model and the central model, delta data or a delta datum are/is generated, which can represent the difference between the local model and the central model. In this case, delta datum denotes a singular of delta data. The term delta data can likewise encompass a single unit. The road user can then transmit the delta data to the server device.

This affords the advantage that the amount of data transferred between the respective road user and the server device can be reduced since there is no need to transfer raw data (i.e. sensor data), but rather only the final new model parameters or a delta value for the respective model parameter. The server device can likewise support the computation complexity for the update of the action instructions for the current traffic situation of the respective real environment.

The examples include a server device, wherein the server device is configured to carry out the method described above that relates to the server device. In other words, the server device is configured to provide a central model of a real environment, to calculate action instructions for road users and to transmit the respective action instruction with the central model wholly or partly to the road user. The server device can also be configured to receive delta data, which can include a difference between a local model of a real environment from the perspective of a road user and the central model, and to generate and/or to update the central model by a number of delta data. Furthermore, the server device can be configured, on the basis of the updated central model, with the use of a predetermined correction criterion, such as, for example, a legally prescribed minimum distance, to readjust the respective action instruction for a road user and to transmit the readjusted action instruction to the road user. This affords the advantage that the calculation of the action instructions for a road user is relocated to the server device, wherein the server device can calculate the action instruction on the basis of a macroperspective of a traffic situation of a real environment.

The examples include a control circuit for a road user, wherein the control circuit is configured to receive model data of a central model of an environment of the road user from a server device and to determine delta data describing a difference between the environment and the central model, said difference being detected by the road users, and to transmit said difference to the server device, and to receive instruction data having action instructions for an action in the environment from the server device and then to adapt the action instruction depending on updated instruction data from the server device. In other words, the control circuit can serve as an interface between the server device and the road user, which can be for example a motor vehicle or a person carrying a mobile terminal as a user device, for example. In this case, the control circuit can be designed in such a way that it can receive model data concerning a central model from the server device and can determine delta data describing a difference between a local model of a real environment and the central model of the real environment and can transmit them to the server device.

Furthermore, the control circuit can be configured to receive from the server device an action instruction for the respective road user and to adapt the action instruction in accordance with a received updated action instruction. The control circuit can likewise be designed to execute the action instruction in a motor vehicle as road user, for example to instigate a steering maneuver or braking. The control circuit can also be configured to function from the standpoint of the server device as a remote control of the motor vehicle for the server device for executing the action instruction. The control device can likewise be configured to instigate a voice, text and/or haptic output of the action instruction in a user device carried by a person. By way of example, via a smartphone with a corresponding application as user device, a warning indication about a rapidly approaching cyclist can be output to a visually impaired pedestrian by a voice output and a vibration of the smartphone.

This affords the advantage that, by the control circuit, road users can be equipped to carry out the above-described method for coordinating road users. In particular, a motor vehicle can be retrofitted with the control circuit, such that said motor vehicle can also be equipped with an autonomous driving function.

The control circuit according to the examples can comprise a processor device configured to carry out the afore-mentioned method. For this purpose, the processor device can comprise at least one microprocessor and/or at least one microcontroller and/or at least one FPGA (Field Program-mable Gate Array) and/or at least one DSP (Digital Signal Processor). Furthermore, the processor device can comprise program code configured to carry out the method when the program is executed by the processor device. The program code can be stored in a data memory of the processor device.

The road user according to the examples in the form of a motor vehicle may be an automobile, in particular as a car or truck, or as a passenger bus or motorcycle.

The examples may encompass realizations which com-prise a combination of the features of a plurality of the examples described.

BRIEF DESCRIPTION OF THE DRAWINGS

These and other aspects and advantages will become more apparent and more readily appreciated from the following description of the examples, taken in conjunction with the accompanying drawings of which.

DETAILED DESCRIPTION

Figure 1:
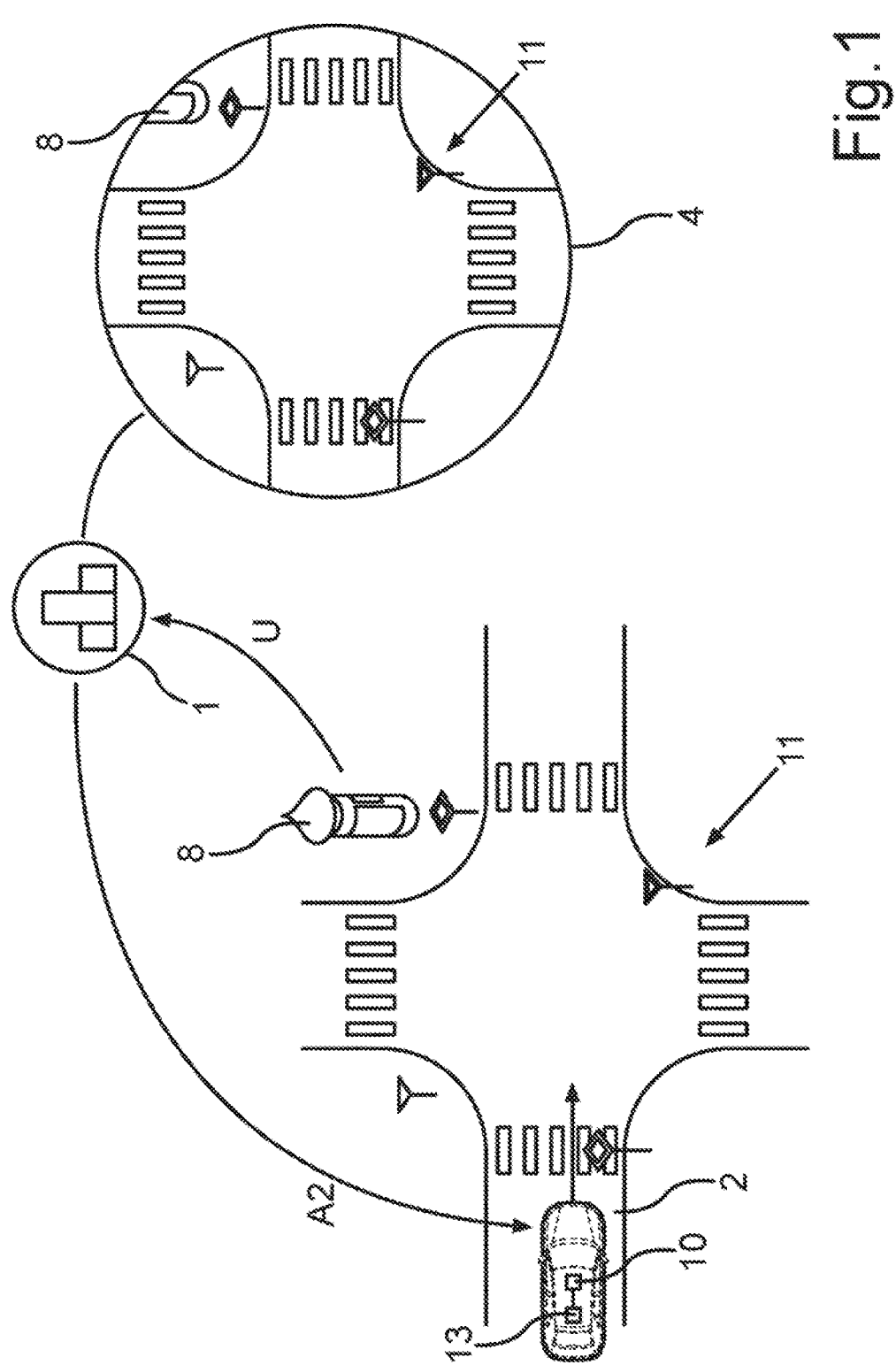
FIG. 1 shows a traffic situation in which a road user is coordinated with respect to a real environment by the central model provided by a server unit.

Reference will now be made in detail to the described examples which are illustrated in the accompanying draw-ings, wherein like reference numerals refer to like elements throughout.

The examples explained below are examples of the inven-tion. In the examples, the described components of the examples each constitute individual features which may be considered independently of one another and which also develop the examples independently of one another. There-fore, the disclosure is also intended to encompass combina-tions of the features of the examples other than those presented. Furthermore, the described examples are also able to be supplemented by further features of the examples from among those already described.

In the figures, identical reference signs designate in each case functional identical elements.

FIG. 1 shows a traffic situation in a real environment 11 in which a motor vehicle 2 as road user is coordinated by a central model 4 of the real environment 11, which central model is provided by a server device 1. In this example, an intersection with a building 8 as an advertising column is illustrated as the real environment 11. In the direction of the intersection in the real environment 11, an autonomously driving motor vehicle 2 in the role of a road user is moving toward the intersection from the left. In this case, the direction of travel of the motor vehicle is illustrated by an arrow. The autonomously driving motor vehicle 2 comprises a control circuit 10, which receives instruction data A2 from the server device 1. The motor vehicle 2 can likewise comprise a sensor circuit 13. In this case, the sensor circuit 13 denotes an interconnection of onboard sensors which can monitor the environment of the motor vehicle 2. They can be for example a camera sensor, a radar sensor and/or else general vehicle data such as, for example, a vehicle speed or a current steering angle. In this case, the control circuit 10 is connected to the sensor circuit 13 for data exchange. In this case, the instruction data A2 are action instructions that can be executed directly by the motor vehicle 2. The instruction data A2 can include for example a steering angle, here for example 0° for traveling straight ahead, and a constant speed of 50 km/h if for example the motor vehicle 2 is moving on the priority road across the intersection in the real environment 11 without traffic. In this case, the instruc-tion data A2 are calculated by the server device 1 by the central model 4 and are transmitted to the control circuit 10 of the motor vehicle 2 with a latency before the intersection in the real environment 11 is reached.

The central model 4 of the real environment 11 is created and updated in the server device 1 by environment data U. In this case, the environment data U can originate from a number of sources. In this regard, sources of environment data U can be for example a digital road map, a traffic management system (traffic signs, traffic light systems, traffic flow, traffic density), weather data, geographic infor-mation, data of a building security system (surveillance camera system), geographic information from road users. The central model 4 can thus correspond to a current virtual representation of the real environment 11. The server device 1 thus has a macroperspective regarding the traffic events in the real environment 11 since the server device 1 can combine many perspectives of the individual sources of the environment data U with one another and therefore view the traffic situation in the real environment 11 from above from a kind of helicopter perspective. On this information basis, the server device 1 can calculate the instruction data A2 as action instruction to the motor vehicle 2. The motor vehicle 2 can thus drive particularly anticipatorily in autonomous driving operation by the instruction data A2.

Figure 2:
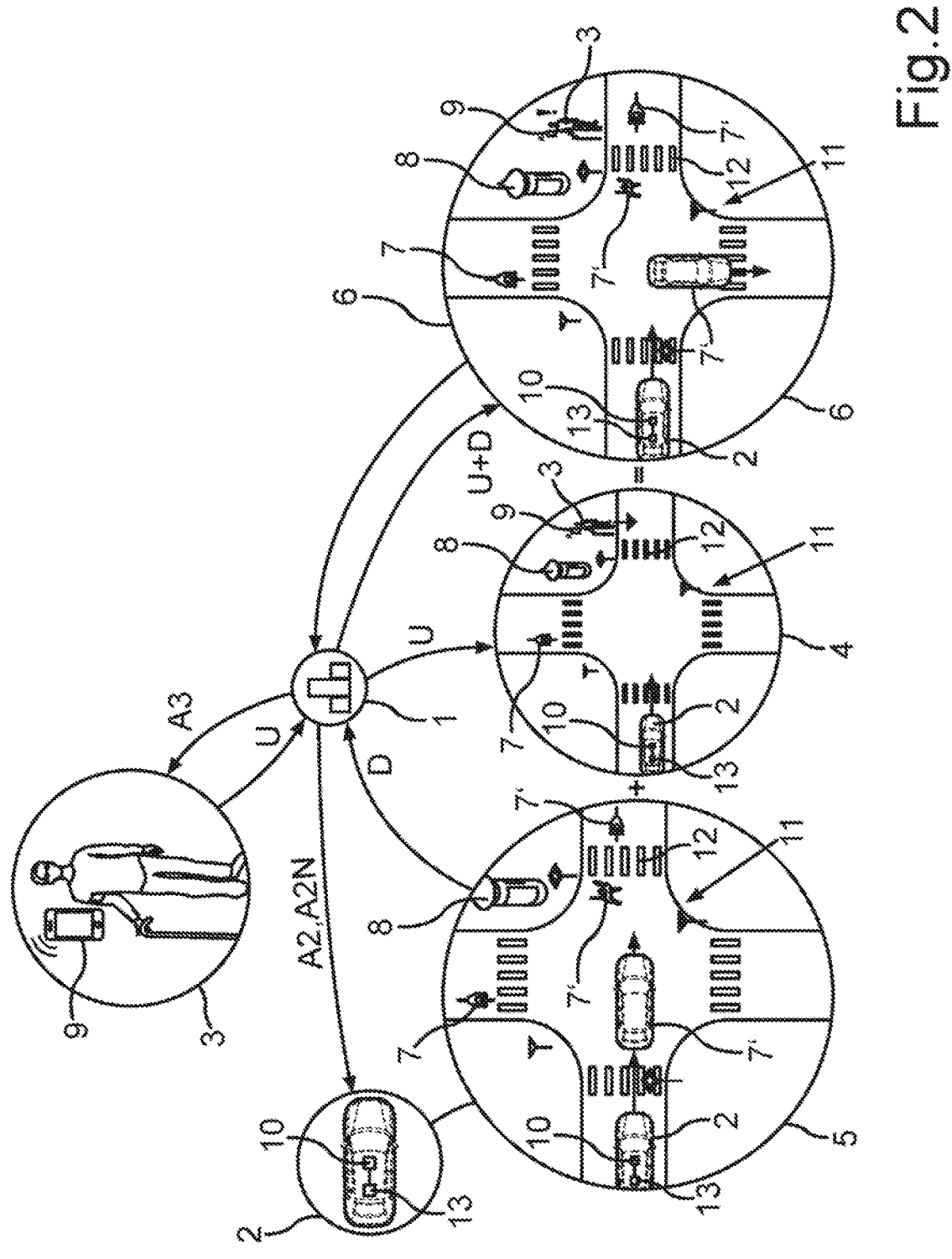
FIG. 2 shows an overview of the process of updating the central model with delta data.

One example of the method of coordinating a plurality of road users 2, 3 is shown in FIG. 2.

FIG. 2 shows one example of the update of an action instruction during the coordination of road users in road traffic in a real environment 11. The process shows two road users 2 and 3, wherein one road user is an autonomously driving motor vehicle 2 having the control circuit 10 and the sensor circuit 13 and the other road user is a visually impaired person 3 carrying, as assistance for orientation, a user device 9 having an integrated control circuit 10. By way of example, the user device 9 having the corresponding control circuit 10 can be designed as a smartphone with a corresponding application. This is referred to as user device 9 in the context of FIG. 2. Likewise, a road user denotes a unit which is a user of the presented method for coordinating road users and can thus receive an action instruction from the server device, and traffic object denotes a unit which takes on a participatory role in the traffic situation. Traffic objects can therefore be pedestrians, motor vehicles or cyclists.

The server device 1 creates a central model 4 of the real environment 11, which central model includes the road users, the motor vehicle 2 and the person 3, in this example. Furthermore, a cyclist as traffic object 7 is known to the server device 1 from the environment data U. Said cyclist may for example have been registered by a surveillance camera of a building in the real environment 11 or by a further road user, for example by the motor vehicle 2 as delta data, and be incorporated in the environment data U. Delta data can also be part of environment data U. The geoposition of the person 3 having the user device 9 is known to the server device 1. The motor vehicle 2 is moving on the priority road across the intersection in the real environment 11, which is indicated by a direction arrow.

In autonomous driving operation of the motor vehicle 2, the destination and the route are generally known. For the action instructions of autonomous driving operation, the method provides for the motor vehicle 2 to travel along the route in the real environment virtually in the central model 4. In this case, the motor vehicle 2 travels along the route in the virtual environment of the central model 4 in a manner ahead by a latency value in comparison with the real environment 11. Before the motor vehicle 2 reaches the real environment 11, the action instructions are calculated as instruction data A2 by the server device 1 for the motor vehicle 2 and are transmitted to the control circuit 10 of the motor vehicle 2. Likewise, before the motor vehicle 2 reaches the real environment 11, data of the central model 4 of the environment 11 are transmitted to the control circuit 10. This has the advantage that already concrete action instructions for the motor vehicle 2 in the real environment 11 are already present and the motor vehicle 2 therefore "subconsciously" knows, i.e. it is known in the motor vehicle 2 which actions said motor vehicle has to carry out in the environment 11. The motor vehicle 2 thus has a kind of artificial subconscious.

In the example shown, the original instruction data A2 according to the traffic situation in the central model 4 include as action instruction the fact that the motor vehicle 2 is intended to move analogously straight ahead along the priority road and is intended to stop at the right-hand pedestrian crossing in order that the person 3 behind the building 8, which is an advertising column in this example, can walk across the right-hand pedestrian crossing. The direction of the person 3 can be extrapolated by the server device on the basis of the person's geoposition. By way of example, on the basis of the last three geopositions of the person 3 the server device 1 can deduce that with a high probability the person 3 would like to cross the pedestrian crossing 12. Alternatively, the server device can assume that the person 3 would like to cross the pedestrian crossing 12 if the person 3 is situated within a minimum distance from the pedestrian crossing 12.

Since the person 3 is situated behind the building 8, the person is not visible from the perspective of the motor vehicle 2. The instruction data A2 can therefore be calculated by the server device 1 from a macroperspective since the server device 1, by the central model 4, can have a kind of helicopter view of the traffic situation in the real environment 11.

In some instances, however, the server device 1 does not represent the complete traffic situation in the real environment 11. The central model 4 can thus be supplemented by a local model 5 of the motor vehicle 2. When the motor vehicle 2 reaches the real environment 11, the motor vehicle 2, by onboard hardware connected to the control circuit 10, can create from its own perspective a local model 5 of the real environment 11 from an aggregate of sensor data of an onboard sensor circuit 13. The onboard sensor circuit 13 can comprise a camera system and/or a radar sensor system, for example. Furthermore the onboard sensor data of the motor vehicle 2 can comprise a quantity of vehicle state data, such as, for example, geoposition, steering angle or current vehicle speed.

From the onboard sensor data of the sensor circuit 13 the motor vehicle 2, by onboard hardware, can create a local model 5 of the real environment 11 in an analogous manner to the central model 4. In this case, additional traffic objects 7' in the real environment 11 are visible from the perspective of the motor vehicle 2 in the local model 5, which were not visible in the central model 4 of the server device 1. In this regard, a motor vehicle 7' in the middle of the intersection, a pedestrian 7' crossing the road and a further cyclist 7' as further traffic objects 7' additionally appear in the local model 5 in contrast to the central model 4. The person 3 is not present in the local model 5 since the person is not visible from the perspective of the motor vehicle 2 because the person 3 is concealed by the building 8. This likewise applies to the cyclist 7 as traffic object in the central model 4 because said cyclist is still too far away from the intersection on the side road. From the local model 5 and the central model 4 with respect to the real environment 11, the control circuit can now determine delta data D for example as a difference between the local model 5 and the central model 4 and can transmit them to the server device 1. In this example, the delta data D comprise the additional traffic objects 7'.

The server device 1 updates the central model 4 with the delta data D and the environment data U and creates an updated central model 6, in which there appear the traffic objects 7 and 7', and also the motor vehicle 2 and the person 3 as road users. On the basis of the updated central model 6, the server device 1 uses a predefined correction criterion to decide whether the action instructions for the road users 2 and 3 are in need of correction.

For the person 3 who would like to cross the pedestrian crossing 12, for example, the correction criterion may be undershooting of a distance between the cyclist on the right in the updated central model 6 as traffic object 7' and the pedestrian crossing 12, which can cause the server device 1 to transmit instruction data A3 to the person 3, said instruction data including an acoustic and/or haptic warning message as action instruction. The instruction data A3 can be received by the user device 9 of the person 3 and the corresponding action instruction can be output as an acoustic and/or haptic output, for example as vibration. Particularly for visually impaired persons, this may be a supplementation for increasing safety in road traffic.

For the motor vehicle 2 it is likewise possible to transmit updated instruction data A2N on the basis of a correction criterion. In the case of the motor vehicle 2 this involves a readjusted action instruction, which can be a delta with respect to the previous instruction data A2. In this regard, a further motor vehicle 7' as traffic object additionally appears in the image of the updated central model 6, which would result in undershooting of a minimum distance between the motor vehicle 2 and the motor vehicle 7' on the basis of the previous instruction data A2. It is likewise necessary to reckon with the cyclist 7' turning off to the left. Since the motor vehicle 7' as traffic object can be assigned to an object category of motor vehicle and the cyclist 7' as traffic object can be assigned to the object category of cyclist by the server device 1, the updating of the geoposition in a time interval and thus the respective observation intensity can be intensified by the server device 1 for the updated instruction data A2N. By way of example, in a predefined time interval, the updating of the geoposition of the motor vehicle 7' relative to the cyclist 7' can be prioritized firstly according to the object category and secondly according to the distance with respect to the motor vehicle 2. By way of example, pedestrian, motor vehicle and cyclist are conceivable as object category for the traffic objects 7 and 7'. In the aforementioned example, a priority may appear as follows: the motor vehicle 7' is observed the most accurately by the server device 1 because it is at the shortest distance from the motor vehicle 2. The server device 1 observes the pedestrian 7' next because he/she is at the next closest distance from the motor vehicle 2, and finally the cyclist 7 and 7' since they are the furthest away from the motor vehicle 2.

For the updating of the instruction data A2 for the motor vehicle 2, consideration is given to undershooting of a minimum distance between the motor vehicle 2 and the motor vehicle 7' and also a priority of the pedestrian 7' when crossing the road on the pedestrian crossing 12. The instruction data can therefore be readjusted by the server device 1 with a braking maneuver and a reduced speed in order to avoid a collision between the motor vehicle 2 and the motor vehicle 7' and the pedestrian 7'. The updated instruction data A2N are subsequently transmitted to the control circuit 10 of the motor vehicle 2, which implements the updated instruction data A2N as an updated action instruction. The aforementioned process is carried out repeatedly in traffic events.

In accordance with one aspect, therefore, the examples comprise a calculation and evaluation model analogous to human perception: the human "knows", i.e. is aware of, his/her environment. The human registers and evaluates only the delta (difference or deviation from the model or the expectation). For an autonomous approach in the final development stage this means: with respect to a current (i.e. a few moments ago) environment captured and/or calculated locally (i.e. externally with respect to the backend/server device), the vehicle supplies to the backend delta information focused and/or concentrated on at least one region. Said backend supplements the precalculated scenario and checks the influence that this change has on the scenario already evaluated, and sends corresponding measures back to the vehicle. This "environment calculated externally a few moments ago" is comparable to the human subconscious (cf. the book by the author D. Kahneman: "Thinking, fast and slow", ISBN: 9780141033570). This environment is calculated as "Model in the Middle" or "Digital Twin" and, besides taking into account the described environment data that are supplied directly to the backend (without a vehicle "detour"), also takes into account—if technically realizable—sensor data from vehicles which went past the actual object at the same location a few moments ago, and thus affords the possibility of not having to calculate and evaluate things in real time.

Present-day sensors in the vehicle may already suffice to implement the concept, and so it is possible to have recourse here to sensor circuits from the prior art.

Overall, this results in an avoidance of complexity in onboard hardware/onboard software of a motor vehicle, reduced consumption (e.g. as a result of reduced energy demand, lower vehicle curb weight), smaller amounts of data (significantly reduced demand for transmission capacity to the backend—particularly with regard to latency and bandwidth), lower costs in the case of damage (e.g. damage class, warranty), higher attractiveness of "nearly new vehicles" (i.e. increase in resell attractiveness).

In a computer environment (server device), the so-called backend, thus keeps environment information that is almost up to date in real time (for example, with an age of at most 10 minutes) for "the subconscious". This information is kept up to date by triggers to be defined, e.g. according to the push and/or pull principle, from sources defined in advance. Graded according to the expected change frequency: streets/buildings/signaling systems and on the other hand weather data vs. road users on foot and on the other hand cycling road users and on the other hand road users (vehicles). Optionally focused on repeatedly traveled routes (which can be signaled by subscription data). The vehicle transmits position and may transmit predetermined further state data, and also delta data classified as relevant (e.g. road users, such as e.g. a vehicle), to the backend. The backend analyzes these changes vis-à-vis the "subconscious" already present and evaluates measures to be proposed, optionally also only adjustment of already transmitted and "preloaded" measures before the actual implementation by the vehicle (further reduction of the data to be transmitted in real time).

The examples related to a method of coordinating road users via a server device, which determines instruction data by a central model and transmits the instruction data as an action instruction to a control circuit of the respective road users. The central model is a virtual representation of a real environment and is created and/or updated by the server device from environment data and delta data of the road users. When the road user reaches the real environment, it creates a local model using onboard sensor data and determines delta data relating to the central model. The delta data are transmitted from the control circuit of the respective road user to the server device, which creates an updated central model using the delta data and the central model. The server device determines and then transmits updated instruction data as a readjustment of the instruction data to the road users.

Overall, the examples show how an external precalculation and pre-evaluation of environment scenarios by individual motor vehicles can be provided for a central mapping system.

A description has been provided with particular reference to examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method of coordinating, by a server device, action instructions for executing actions, to motor vehicles and/or user devices in roles of a plurality of road users, the method comprising:

by the server device, repeatedly creating, based on environment data from a plurality of data sources, including from the plurality of road users, corresponding to respective real environments, a digital central model that is a virtual representation of the respective real environments, calculating, based on the digital central model, instruction data respectively for the action instructions for coordinated road users, from among the plurality of road users, such that an action instruction, from among the action instructions, defines an action, from among the actions, to be executed by a respective coordinated road user, from among the coordinated road users, in a real environment of the respective coordinated road user, from among the respective real environments, and the digital central model virtually describes a plurality of traffic objects, a traffic object, from among the plurality of traffic objects, assigned to an object category, from a plurality of object categories, and at least one stipulation, from among a plurality of stipulations, stipulated for the object category;

transmitting the action instructions to the at least one coordinated road users;

repeatedly providing the coordinated road users with the digital central model such that the coordinated road users generate and transmit to the server device, respective delta data of the coordinated road users based on a comparison of the digital central model with the respective real environments of the coordinated road users, the respective delta data describing a difference between the respective real environments of the coordinated road users and the digital central model;

receiving from the coordinated road users, the respective delta data; and updating the digital central model on basis of the respective delta data of the coordinated road users and using the digital central model updated to check whether the instruction data for the at least one coordinated road user, from among the coordinated road users, is to be corrected in accordance with a correction criterion based on at least one stipulation stipulated for the object category, from among a plurality of stipulations including, a change frequency specifying a maximum rate at which the respective delta data of the coordinated road users is generated for the traffic object of the object category, and a priority stipulating an order with regard to determining the respective delta data of the coordinated road users, based on available computation time; and when the instruction data to be corrected is identified according to the correction criterion, updating the instruction data by adapting the action instruction to the digital central model updated, and transmitting, to the at least one coordinated road user, the instruction data of the action instruction updated for the at least one coordinated road user.

2. The method as claimed in claim 1, wherein the adapting of the action instruction is prioritized by the server device depending on a speed of movement of the at least one coordinated road user and/or a traffic situation that the at least one coordinated road user is in.

3. The method as claimed in claim 1, wherein the server device generates and/or updates the digital central model additionally on basis of sensor data from the at least one coordinated road user.

4. The method as claimed in claim 3, wherein the sensor data comprise at least some data, from among data including geoposition data of a current location of the coordinated road users, speed data of a speed of movement of the coordinated road users, or observation data concerning the respective real environments from respective viewpoints of the coordinated road users.

5. The method as claimed in claim 1, wherein a geoposition and/or a relative position of the traffic object moving in the respective real environments are/is extrapolated in the digital central model by the server device.

6. The method as claimed in claim 1, wherein the server device transmits temporally in advance the instruction data for the action instruction with a future execution time, such that a latency value is determinable between a transmission time of the instruction data and the future execution time, wherein, by selection of the transmission time, the latency value is set depending on a speed of the at least one coordinated road user and/or a traffic situation in a region in front of the at least one coordinated road user.

7. The method as claimed in claim 6, wherein the at least one coordinated road user performs a simulation of carrying out the action instruction in in a manner shifted temporally ahead by the latency value such that a future traffic situation resulting from the simulation is estimable by the digital central model.

8. The method as claimed in claim 1, wherein in performing the comparison of the respective real environments with the digital central model, the at least one coordinated road user carries out:

by sensor data of a sensor circuit carried by the at least one coordinated road user, a digital local model of a real environment of the at least one coordinated road user, from among the respective real environments is created and a difference between the digital local model and the digital central model is determined and described delta data of the at least one coordinated road user among as the respective delta data of the coordinated road users, wherein the at least one coordinated road user transmits the delta data of the at least one coordinated road user to the server device.

9. A server device, comprising:

a processor configured to coordinate action instructions for executing actions, to motor vehicles and/or user devices in roles of a plurality of road users, the processor configured to by, repeatedly create, based on environment data from a plurality of data sources, including from the plurality of road users, corresponding to respective real environments, a digital central model that is a virtual representation of the respective real environments, calculate, based on the digital central model, instruction data respectively for action instructions for coordinated road users, from among the plurality of road users, such that an action instruction, from among the action instructions, defines an action, from among the actions, to be executed by a respective coordinated road user, from among the coordinated road users, in a real environment of the respective coordinated road user, from among the respective real environments, and the digital central model virtually describes a plurality of traffic objects, a traffic object, from among the plurality of traffic objects, assigned to an object category, from a plurality of object categories, and at least one stipulation, from among a plurality of stipulations, stipulated for the object category;

transmit the action instructions to the coordinated road users;

repeatedly provide the coordinated road users with the digital central model such that the coordinated road users generate and transmit to the server device, respective delta data of the coordinated road users based on a comparison of the digital central model with the respective real environments of the coordinated road users, the respective delta data describing a difference between the respective real environments of the coordinated road users and the digital central model;

receive from the coordinated road users, the respective delta data;

update the digital central model on basis of the respective delta data of the coordinated road users and using the digital central model updated to check whether the instruction data for at least one coordinated road user, from among the coordinated road users, is to be corrected in accordance with a correction criterion based on at least one stipulation stipulated for the object category, from among a plurality of stipulations including, a change frequency specifying a maximum rate at which the respective delta data of the coordinated road users is generated for the traffic object of the object category, and a priority stipulating an order with regard to determining the respective delta data of the coordinated road users, based on available computation time; and when the instruction data to be corrected is identified according to the correction criterion, update the instruction data by adapting the action instruction to the digital central model updated, and transmit, to the at least one coordinated road user, the instruction data of the action instruction updated for the at least one coordinated road user.

10. The server device as claimed in claim 9, wherein the processor is further configured to generate and/or update the digital central model additionally on basis of sensor data from the at least one coordinated road user.

11. The server device as claimed in claim 10, wherein the sensor data comprise at least some data, from among data including geoposition data of a current location of the coordinated road users, speed data of a speed of movement of the coordinated road users, or observation data concerning the respective real environments from respective view points of the coordinated road users.

12. The server device as claimed in claim 9, wherein the processor is further configured to extrapolate a geoposition and/or a relative position of the traffic object moving in the respective real environments in the digital central model.

13. The server device as claimed in claim 9, wherein the processor is further configured to control transmitting temporally in advance the instruction data for the action instruction with a future execution time, such that a latency value is determinable between a transmission time of the instruction data and the future execution time, wherein, by selection of the transmission time, the latency value is set depending on a speed of the at least one coordinated road user and/or a traffic situation in a region in front of the at least one coordinated road user.

14. The server device as claimed in claim 13, wherein the at least one coordinated road user performs a simulation of carrying out the action instruction in a manner shifted temporally ahead by the latency value such that a future traffic situation is estimable by the digital central model.

15. The server device as claimed in claim 9, wherein in performing the comparison of the respective real environments with the digital central model, the at least one coordinated road user carries out:

by sensor data of a sensor circuit carried by the at least one coordinated road user, a digital local model of a real environment of the at least one coordinated road user, from among the respective real environments, is created and a difference between the digital local model and the digital central model is determined and described as delta data of the at least one coordinated road user among the respective delta data of the coordinated road users, wherein the at least one coordinated road user transmits the delta data of the at least one coordinated road user to the server device.

16. A control circuit for motor vehicles and/or user devices in roles of a plurality of road users, the control circuit configured for a road user, from among the plurality of road users, to, receive model data of a digital central model of an environment of the road user from a server device, the server device including a processor configured to coordinate action instructions for executing actions, to the plurality of road users, the processor configured to, repeatedly create, based on environment data from a plurality of data sources, including from the plurality of road users, corresponding to respective real environments, the digital central model that is a virtual representation of the respective real environments, calculate, based on the digital central model, instruction data respectively for action instructions for coordinated road users, from among the plurality of road users, such that an action instruction, from among the action instructions, defines an action, from among the actions, to be executed by a respective coordinated road user, from among the coordinated road users, in a real environment of the respective coordinated road user, from among the respective real environments, and the digital central model virtually describes a plurality of traffic objects, a traffic object, from among the plurality of traffic objects, assigned to an object category, from a plurality of object categories, and at least one stipulation, from among a plurality of stipulations, stipulated for the object category;

transmit the action instruction to the road user as a coordinated road user among the coordinated road user;

repeatedly provide the coordinated road users with the digital central model such that the coordinated road users generate and transmit to the server device, respective delta data of the coordinated road users based on a comparison of the digital central model with the respective real environments of the coordinated road users, the respective delta data describing a difference between the respective real environments of the coordinated road users and the digital central model;

receive from the coordinated road users, the respective delta data;

update the digital central model on basis of the respective delta data of the coordinated road users and using the digital central model updated to check whether the instruction data for at least one coordinated road user, from among the coordinated road users, is to be corrected in accordance with a correction criterion based on at least one stipulation stipulated for the object category, from among a plurality of stipulations including, a change frequency specifying a maximum rate at which the respective delta data of the coordinated road users is generated for the traffic object of the object category, and a priority stipulating an order with regard to determining the respective delta data of the coordinated road users, based on available computation time; and when the instruction data to be corrected is identified according to the correction criterion, updating the instruction data by adapting the action instruction to the digital central model updated, and transmitting, to the at least one coordinated road user, the updated instruction data of the action instruction updated for the at least one coordinated road user;

perform, based on the digital central model provided from the server device, the comparison to determine the delta data of the road user describing a difference between the real environment of the road user and the digital central model provided from the server device;

transmit the delta data of the road user to the server device; and receive an updated instruction data of the action transmitted from the server device, based on the correction criterion identified by the server device.

* * * * *